(12) United States Patent
Ehnholm et al.

(10) Patent No.: US 12,521,101 B2
(45) Date of Patent: Jan. 13, 2026

(54) MEDICAL DEVICE

(71) Applicant: Aalto University Foundation sr, Aalto (FI)

(72) Inventors: Gösta Ehnholm, Aalto (FI); Jouni Rantanen, Aalto (FI); Yohann Le Bourlout, Aalto (FI)

(73) Assignee: Aalto University Foundation sr, Aalto (FI)

( * ) Notice: Subject to any disclaimer, the term of this patent is extended or adjusted under 35 U.S.C. 154(b) by 827 days.

(21) Appl. No.: 17/837,098

(22) Filed: Jun. 10, 2022

(65) Prior Publication Data
US 2022/0401084 A1 Dec. 22, 2022

(30) Foreign Application Priority Data

Jun. 11, 2021 (EP) ..................................... 21179113

(51) Int. Cl.
*A61B 5/00* (2006.01)
*A61B 10/02* (2006.01)

(52) U.S. Cl.
CPC ...... *A61B 10/02* (2013.01); *A61B 2010/0208* (2013.01); *A61B 2560/0266* (2013.01)

(58) Field of Classification Search
CPC ............ A61B 10/02; A61B 2010/0208; A61B 2560/0266; A61B 17/320068; A61B 17/3476; A61B 2017/00119; A61B 2017/00123; A61B 10/0233; A61B 10/0283; A61B 2017/00473; A61B 2017/320069; A61B 2017/3409; A61B 17/34
See application file for complete search history.

(56) References Cited

U.S. PATENT DOCUMENTS

| 12,070,235 B2* | 8/2024 | Schwery | A61B 17/1637 |
| 2012/0209303 A1* | 8/2012 | Frankhouser | A61M 5/3287 |
| | | | 606/169 |
| 2014/0066818 A1 | 3/2014 | Akagane | |
| 2014/0074013 A1* | 3/2014 | McCary | A61F 9/00745 |
| | | | 604/264 |

(Continued)

FOREIGN PATENT DOCUMENTS

WO  WO 2020240084 A1  12/2020

*Primary Examiner* — May A Abouelela
(74) *Attorney, Agent, or Firm* — Laine IP Oy

(57) ABSTRACT

According to an example aspect of the present invention, there is provided a biopsy needle device comprising a biopsy needle attachment mechanism arranged to mechanically couple a biopsy needle to the biopsy needle device, an actuator mechanism comprising a transducer configured to interconnect electrical signals at one port to mechanical motion at another port, the actuator mechanism configured to transmit flexural vibration to the biopsy needle when the biopsy needle is coupled to the biopsy needle device, a sensor device configured to measure a power of the flexural vibration transmitted to the biopsy needle via the transducer and a reflected power of flexural vibration received by the biopsy needle device from the biopsy needle, and circuitry configured to determine a difference between the power of the flexural vibration transmitted to the biopsy needle and the reflected power of flexural vibration received by the biopsy needle device from the biopsy needle.

20 Claims, 4 Drawing Sheets

(56) References Cited

U.S. PATENT DOCUMENTS

| | | |
|---|---|---|
| 2015/0359560 A1* | 12/2015 | Bakhtyari-Nejad-Esfahani .......... A61B 10/04 600/424 |
| 2018/0021599 A1* | 1/2018 | Kim ............... A61B 17/320068 604/22 |
| 2018/0368883 A1* | 12/2018 | Rossa ................ A61B 17/3403 |
| 2019/0321013 A1 | 10/2019 | Nieminen et al. |
| 2020/0214737 A1* | 7/2020 | Ian ................. A61B 17/320068 |
| 2020/0253639 A1* | 8/2020 | Kim ....................... A61B 17/29 |
| 2020/0261113 A1* | 8/2020 | Bagwell ............... A61B 8/4488 |
| 2021/0196513 A1* | 7/2021 | Govari ........... A61B 17/320068 |
| 2021/0353461 A1* | 11/2021 | Govari ................ A61F 9/00781 |
| 2023/0101666 A1* | 3/2023 | Holenstein ............. C12M 45/00 435/308.1 |

\* cited by examiner

MEDICAL DEVICE

FIELD

The present disclosure relates to medical devices, such as, for example, vibration-actuated biopsy needle devices.

BACKGROUND

Biopsy needles are used in the medical field to obtain samples from biological systems. Diagnosis of many conditions, such as cancer, requires a biopsy taken from a patient, the biopsy subsequently being examined by a pathologist.

Two general classes of biopsy needles include front-end capture devices and side capture devices. Front-end capture devices tend to be smaller than side capture devices. A front-end capture device obtains the biopsy sample using the tip of the biopsy needle.

Smaller front-end collection device designs include those marketed as Chiba, or Westcott. These include variations on the theme of a tube cut at one acute angle, that is, bevelled once. Such a geometry allows the back part of the bevel to cut the tissue until about 50% of the perimeter of the inner bore of the needle.

Chiba-style needles exist in dimensions from larger than 16 gauge to as small as about 31 gauge. For example, 25 gauge needles have a typical inner diameter of 241 microns and an outer diameter of 495 microns, while 27 gauge needles have a typical inner diameter of 190 microns and an outer diameter of 393 microns. Chiba style needles are commonly used for fine needle aspiration biopsies in which the intent is to acquire dissociated cells or partially dissociated tissue fragments rather than intact tissue near the size of the inner diameter if the needle.

Two-prong and three-prong Franseen type biopsy needle tips are known. The two-prong tip is a tube part cut at about a 10-15 degree bevel, with a second 10-15 degree bevel cut after rotating the needle 180 degrees. The three-prong Franseen-type tip has three bevels cut at about 10-15 degrees with a 120 degree rotation of the tube part between bevels.

Side capture devices generally employ a slot cut into the side of a solid cylinder, near the distal end which is inserted into tissue to be biopsied. The cylinder is advanced into a tissue mass and then a circumferentially shaped, sharp sleeve is advanced over the slot to shave off a core-shaped sample which becomes trapped inside the slot. Vacuum-assisted core biopsy devices are designed to encourage the sample to fall into the slot. Other improvements of core biopsy devices enable multiple fragments to be obtained without removing the device from a cannula, for example.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided a biopsy needle device comprising a biopsy needle attachment mechanism arranged to mechanically couple a biopsy needle to the biopsy needle device, an actuator mechanism comprising a transducer configured to interconnect electrical signals at one port to mechanical motion at another port, the actuator mechanism configured to transmit flexural vibration to the biopsy needle when the biopsy needle is coupled to the biopsy needle device, a sensor device configured to measure a power of the flexural vibration transmitted to the biopsy needle via the transducer and a reflected power of flexural vibration received by the biopsy needle device from the biopsy needle, and circuitry configured to determine a difference between the power of the flexural vibration transmitted to the biopsy needle and the reflected power of flexural vibration received by the biopsy needle device from the biopsy needle.

EMBODIMENTS

Disclosed herein is a biopsy needle device which enables obtaining biopsy samples from animal or human targets in an optimized manner. In detail, by imparting a flexural vibration into the biopsy needle when taking the biopsy sample, the sample may be obtained using less force, and the sample yield may be increased. At the same time, the energy imparted from the flexural vibration to the tissue being sampled may be controlled, to reduce harm caused by the biopsy procedure and the sample itself is protected from damage due to excessive vibration. These benefits are obtained by determining both a power of flexural vibration imparted to the biopsy needle and a power of flexural vibration reflected back from the biopsy needle to the biopsy needle device. The difference of these powers corresponds to a power deposited in the tissue being sampled.

Figure 1A:
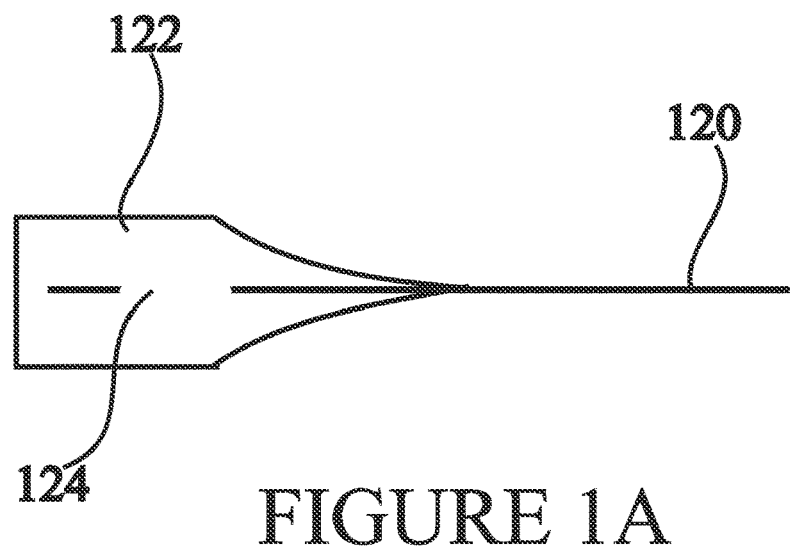
FIGS. 1A, 1B and 1C illustrate examples of biopsy needle devices in accordance with at least some embodiments of the present invention.
Figure 1B:
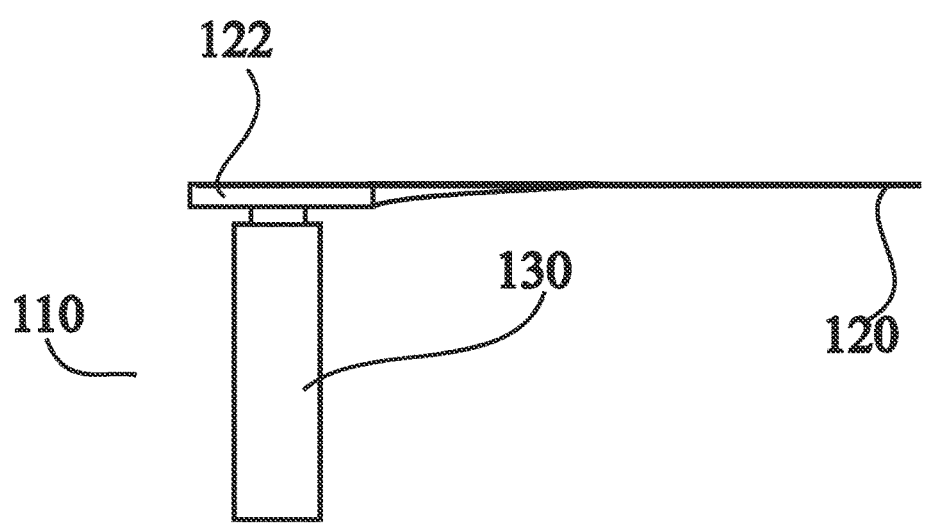

FIGS. 1A and 1B illustrate an example biopsy needle device in accordance with at least some embodiments of the present invention. FIG. 1A is a top view of the biopsy needle device 110. The top 122 of the device comprises a biopsy needle attachment mechanism 124, such as a groove which may receive a biopsy needle 120 and mechanically couple the biopsy needle to the biopsy needle device. Alternatively to a groove, a hollow tube or clamp may be arranged in the top 122 of the device to accept a biopsy needle, for example. Visible in FIG. 1A is a tapered form of the top 122 of the biopsy needle device, such that the biopsy needle attachment mechanism 124 as a whole may have a tapered form. A benefit of the tapered form is that it matches a mechanical impedance of the transducer of the device to a flexural impedance of the biopsy needle when the biopsy needle is coupled to the biopsy needle device.

FIG. 1B is a side view of the biopsy needle device 110. The top 122 is arranged on an actuator mechanism 130. Actuator mechanism 130 comprises a transducer, which is configured to interconnect electrical signals provided to the transducer to mechanical motion. For example, the transducer may comprise a Langevin piezoelectric stack. In detail, the transducer is configured to transmit a flexural vibration movement to biopsy needle 120, when biopsy needle 120 is coupled to the biopsy needle device 110. In some embodiments biopsy needle 120 is detachable from biopsy needle device 110, whereas in other embodiments biopsy needle 120 is fixedly attached to biopsy needle device 110. A benefit of a detachable biopsy needle 120 is that the needle may be changed, for example a fresh needle may be used for each biopsy sample. Top 122 may extend both to the left and to the right of actuator mechanism 130, as illustrated.

Figure 1C:
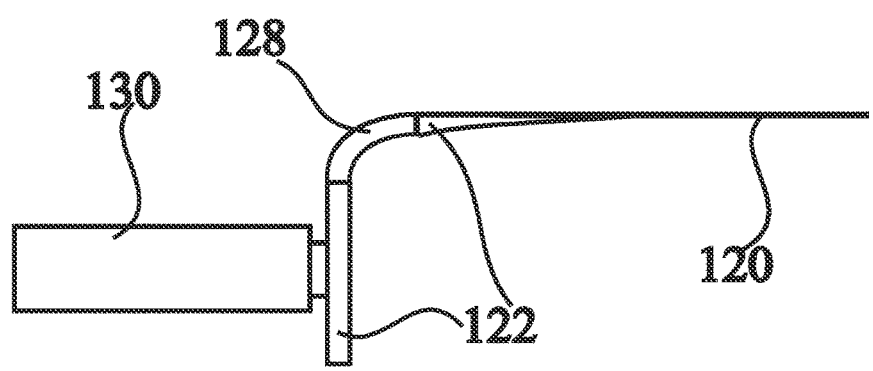

In the example of FIG. 1C, the biopsy needle 120, when attached, is in a direction parallel to an axis of actuator mechanism 130, with a curved part 128 arranged between two sections of top 122, as illustrated. The curved part 128 may curve by about 90 degrees, or by between 87 and 93 degrees, for example. The shape of the device of FIG. 1C is more usable in certain usage contexts than the shape of FIG. 1B. Further, flexural vibration power reflected from the biopsy needle 120 tip is not coupled as strongly with actuator mechanism 130, and further, curved part 128 allows a large portion of flexural vibration power to be conveyed to biopsy needle 120. Top 122 may extend both above and below actuator mechanism 130, as illustrated.

In general, aspects of the invention disclosed herein may be used with the device of, for example, FIG. 1B or FIG. 1C.

Figure 3:
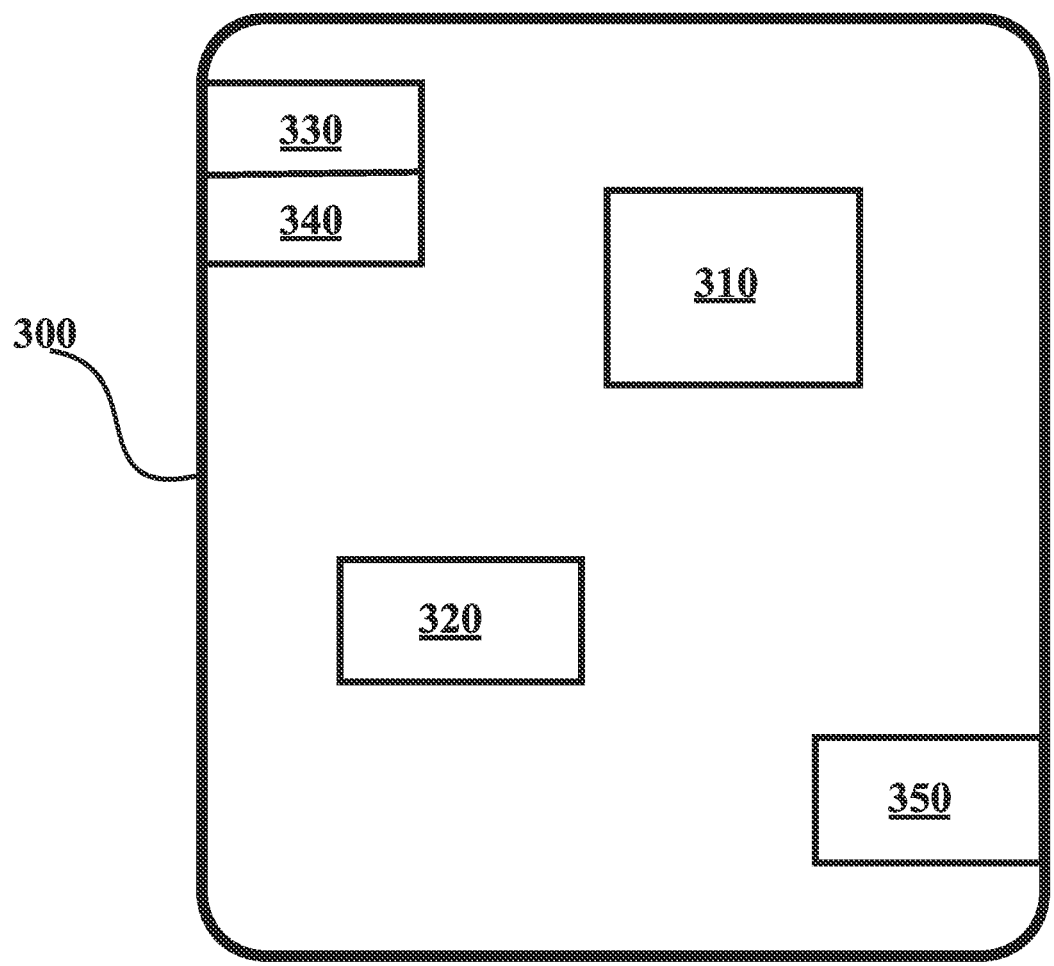
FIG. 3 illustrates an example apparatus capable of supporting at least some embodiments of the present invention.

Biopsy needle device 110 is further configured with a sensor device arranged to measure a power of the flexural vibration transmitted to the biopsy needle via the transducer. This power of flexural vibration transmitted to the biopsy needle may be measured in terms of an electrical power used to generate the transmitted flexural vibration in the transducer, for example. The sensor device is further configured to measure a reflected power of flexural vibration received by biopsy needle device 110 from the biopsy needle 120. Biopsy needle device 110 further comprises a processor configured to determine a difference between the power of the flexural vibration transmitted to the biopsy needle 120 and the reflected power of flexural vibration received by the biopsy needle device 110 from the biopsy needle 120. The sensor device and the processor may be comprised in a data management device of the biopsy needle device. Such a data management device, which may be of a distributed nature, is illustrated in FIG. 3.

Biopsy needle device 110 may further comprise an electronic device which has an electric impedance which matches an electric impedance of the transducer. Design of normal linear electrical amplifiers, for example for radio transmitters, is characterized by a fixed voltage generator in series with an "output" resistive impedance. The maximal power that can delivered by such an amplifier is into a load with the same impedance—the impedances are then matched. Mismatching can be easily measured at the amplifier with simple reflectance bridges, also known as standing wave radio, SWR, bridges. If the biopsy driving amplifier is designed to deliver maximally a safe power level when it is matched, via the transducer, to the needle then the needle will not be able to deliver more than this to the patient and the maximum delivered power will be inherently limited. This a technical effect is obtained from the matching in that the delivered power may be dependably limited. In the present disclosure, a "matched" impedance may mean an impedance that differs either way from another by at most 3%, 5%, 7% or 10%, for example.

In use, flexural vibration of biopsy needle 120 deposits a part of the flexural vibration energy transmitted to biopsy needle 120 into the tissue being sampled. This tissue may be part of a living human or animal, wherefore limiting an extent of power deposition from biopsy needle 120 to the tissue is relevant. Excessive deposition of power from biopsy needle 120 to the tissue may result in overheating of the tissue, for example. The tissue will begin to increase in temperature in case the rate of power deposition from biopsy needle 120 exceeds a rate at which the tissue can dissipate thermal energy locally, such as via circulation of blood. Excessive mechanical vibration of the biopsy needle may also directly damage the tissue being sampled. Further, excessive flexural vibration of biopsy needle 120 may damage a sample captured by the biopsy needle. Thus it is beneficial to limit the flexural vibration power transmitted to the needle.

In use, the transducer may be activated by feeding alternating current power at ultrasound frequency to an input of the transducer. The transducer will responsively make a powerful piston movement to shake the end of actuator mechanism 130. The biopsy needle device thus produces a wave and passes it along to biopsy needle 120, which will experience a flexural, snakelike wave motion along its length. By design, almost 90% of the electrical power fed into the transducer may be passed on to this flexural wave movement extending all the way to the biopsy needle tip, provided that there is no external damping mechanism, in other words, when the needle is in free air. In use, a part of the flexural vibration power transmitted to the biopsy needle is reflected from the needle tip backward, and received in the transducer. A biopsy needle in free air will reflect back the power which will then return all the way back to the transducer. In the transducer, the reflected power will combine with the incoming, forward, power. The combination depends on the phase between forward and reflected power: If their voltages have the same phase their currents are opposite a large voltage and small current may be generated. If the currents have the same phase and the voltages are opposite a large current and a small voltage may be generated. In both cases the product of voltage and current will be the same and equal to the power loss in the biopsy system.

The phase difference between forward and reflected flexural power may be adjusted by changing the frequency of the alternating current input to the transducer and measuring voltage to see how impedance changes: a large voltage will correspond to a large impedance, a large current on the other hand signals a small impedance. The frequency for the maximum impedance Zp is, in analogy to a simple resonance circuit, called the parallel resonance frequency fp, the minimum impedance Zs gives the series resonance frequency fs. The difference between the two frequencies, which may in practice be approximately 3 kHz, corresponds to half a wavelength change of the needle flexural wave. At intermediate frequencies the magnitude of the impedance changes, but the forward and reflected power levels do not, only the phase difference between them changes. To first order one can show that at a frequency between fp and fs, approximately=½(fp+fs), the magnitude of the impedance is $(ZpZs)^{1/2}$, and the phase angle is 90 degrees. This magnitude is in a sense the matched value for the generator impedance for driving the stack, denoted Zo. It can easily be changed by adding a transformer at the transducer input, for example to 50 ohms which is a usual value for the output impedance of electronics signal generators.

Assuming next that a driving generator having an output impedance Zo is connected to the transducer and set to deliver a power P. If the biopsy needle is unloaded, that is, in air, or clamped to be fixed, most of this power will be reflected back and be absorbed in the driving generator. Neglecting any small losses in the transducer, the complex power will be equal to P=P(cos(phi)+jsine(phi)), where phi is the phase angle between incident and reflected signals, with j designating reactive power. If we designate phi=90 degrees to correspond to an open needle we get phi=−90 degrees for a fixed needle tip. Matching the driving generator to the system in this way provides the benefit that the power delivered to the patient has a known upper limit. Both the incident, forward power and the reflected power can be easily and precisely be measured, combined with the fact that system losses are small it enables the operator to get a precise number for the power deposited to the tissue being sampled. As noted above, when the impedances are the same, the system delivers the largest possible power. Any impedance change will then increase mismatch, which reduces the delivered power.

Figure 2:
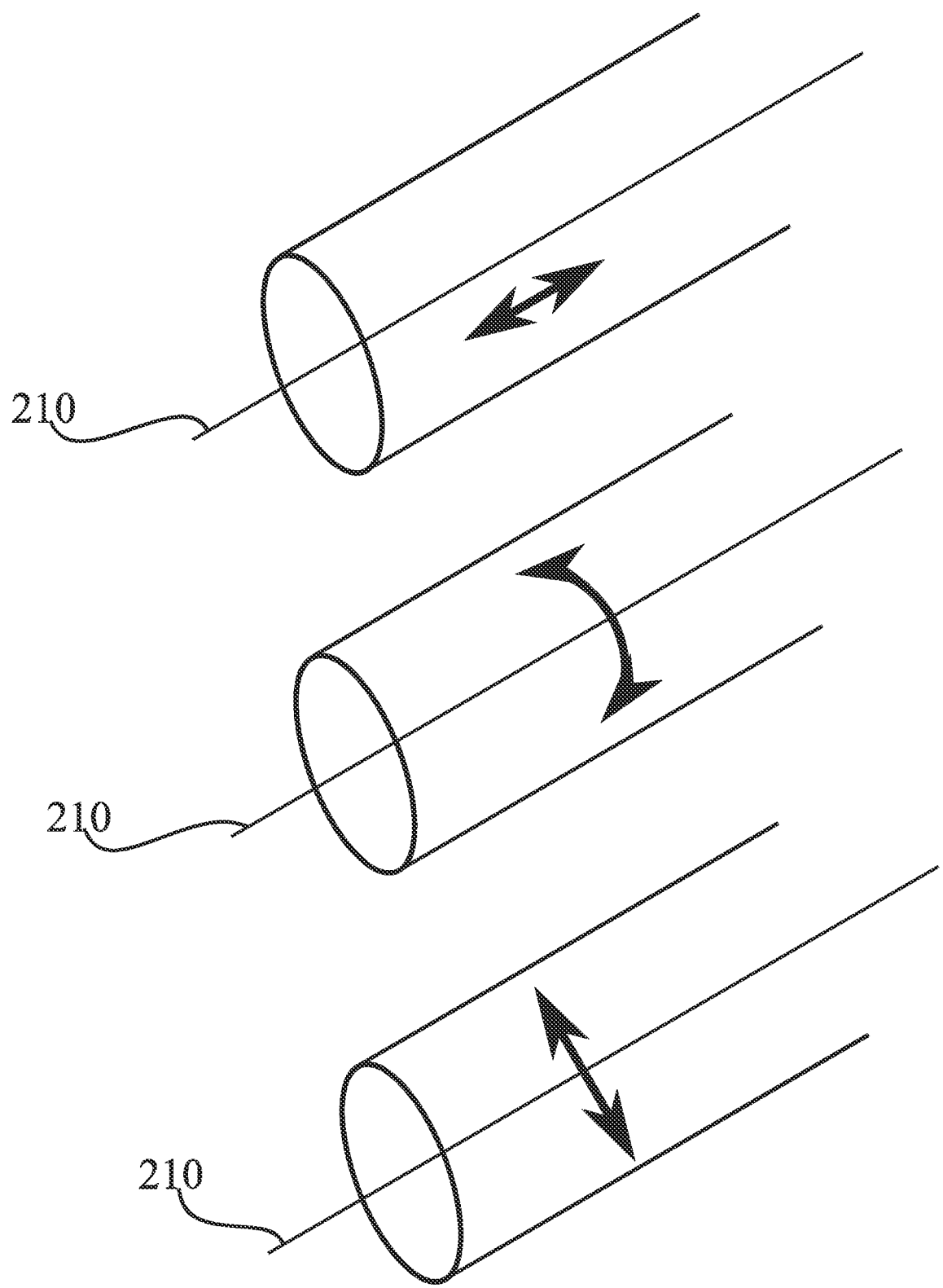
FIG. 2 illustrates vibration modes.

FIG. 2 illustrates vibration modes. The thick black arrows denote the direction of vibration of matter of the biopsy needles. At the top of FIG. 2, a longitudinal vibration is illustrated. By longitudinal waves it is meant waves wherein matter is displaced by the vibration in a direction parallel to the direction where the wave propagates. In a biopsy needle, for example, longitudinal waves would take the form of a compression wave in a direction parallel to the longitudinal axis 210.

In the middle of FIG. 2, a torsional vibration is illustrated. By torsional waves it is meant angular vibration about an axis, for example in the case of a biopsy needle, torsional waves take the form of rotational vibration about the longitudinal axis 210 of the biopsy needle. Using a right-hand rule, where the thumb of a right hand is aligned parallel to the longitudinal axis, molecules comprised in the tubular part and tip part of a biopsy needle, for example, undergo vibrational motion back and forth in a direction indicated by the flexed fingers of this right hand. As this is an angular vibration, the molecules vibrate along a curved trajectory.

In the lowest part of FIG. 2, a flexural vibration is illustrated. By flexural waves it is meant waves wherein matter is displaced in a direction perpendicular to the direction where the wave propagates. In a biopsy needle example, the direction of propagation may be parallel to the longitudinal axis 210 of the needle, wherefore flexural vibration involves matter of the needle vibrating linearly back and forth in a direction perpendicular to the longitudinal axis 210 of the needle. There may be one or two directions of simultaneous flexural vibration perpendicular to the longitudinal axis 210.

In use, the biopsy needle device, for example the processor thereof, may be configured to reduce a power of the actuator mechanism responsive to a determination that the difference between the transmitted and received powers of flexural vibration exceeds a preconfigured limit. Thus the preconfigured limit corresponds to a maximum flexural power deposited in the tissue to be biopsied, since the difference between the transmitted and received powers is power that is deposited in the tissue. Separately, the actuator mechanism may be limited to transmit the flexural vibration to biopsy needle 120 at most at a preconfigured maximum power, or the processor may be configured to cause the actuator mechanism to transmit the flexural vibration to the biopsy needle at most at the preconfigured maximum power. In general, the preconfigured maximum power may be at most 1.5 Watts, at most 2.0 Watts, at most 2.5 Watts or at most 3.0 Watts, for example. In other words, there may be two separate limit values applied, separately or together: one for the power deposited in the tissue being biopsied and another one for flexural vibration power transmitted into the biopsy needle.

In some embodiments, the processor is configured to maximize a ratio of the reflected power of flexural vibration received by the biopsy needle device 110 from biopsy needle 120 to the power of flexural vibration transmitted to the biopsy needle. This corresponds to reducing losses in the needle device. One method to maximize this ratio is to increase the power of the flexural vibration transmitted to the needle to the preconfigured maximum power.

As noted above, biopsy needle device 110 may be configured to provide to actuator mechanism 130 an electric signal, the electric signal comprising pulses of alternating current, the alternating current alternating at an ultrasound frequency during the pulses. The pulses of the electric signal may have equal length. Whether or not the pulses have equal length, the pulses may have lengths of between 0.5 and 1.5 milliseconds, for example. Consecutive ones from among the pulses may be separated from each other by a space of time equal to at least 50% of the length of the previous pulse. This separation provides the benefit that the flexural vibration stimulated into the biopsy needle by the previous pulse has time to attenuate before the new pulse begins. Thus the biopsy needle is no longer "ringing" with previously stimulated vibration when the new pulse begins, providing the benefit that the behaviour of the biopsy needle is more predictable and controllable.

In some embodiments, an ultrasound-based imaging device is used to assist in guiding the biopsy needle to a desired spot, such as a tumour or organ in a person's body that is to be biopsied. The flexural vibration of the biopsy needle is particularly suitable for this, since the flexural vibration causes matter of the biopsy needle to vibrate in a direction parallel to an axis from the biopsy needle to the imaging device. To facilitate this imaging-based guidance, biopsy needle device 110 may be configured to provide a synchronization signal which is synchronized with the electrical pulses used to stimulate the biopsy needle to vibrate flexurally. In particular, the synchronization signal may be emitted each time a pulse of the electric signal has had time to stimulate the biopsy needle to vibrate flexurally and before this vibration has had time to die out after the pulse has ended. This way, the ultrasound imaging device does not obtain an image at a time, when the ringing of the needle has died out. In some embodiments, the ultrasound imaging device and the biopsy needle device 110 are part of the same system, wherein either the biopsy needle device is used to synchronize the ultrasound imaging device, or a same synchronization source is used to synchronize both the ultrasound imaging device and the biopsy needle device.

FIG. 3 illustrates an example apparatus capable of supporting at least some embodiments of the present invention. Illustrated is device 300, which may comprise, for example, a data management device of the biopsy needle device 110 of FIG. 1B. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A72 processing core manufactured by ARM Holdings or a Zen processing core designed by Advanced Micro Devices Corporation. Processor 310 may comprise at least one Qualcomm Snapdragon, and/or Intel Atom processor. Processor 310 may comprise at least one application-specific integrated circuit, ASIC. Processor 310 may comprise at least one microcontroller or field-programmable gate array, FPGA. A processor (CPU) or an FPGA may be configured to analyze both signals of flexural vibration transmitted to the biopsy needle and signals representing reflected power of flexural vibration received by the biopsy needle device from the biopsy needle. An FPGA, where present, may comprise a Xilinx Spartan-6 FPGA XC6SLX16-1L, for example. In general, at least one processing core, at least one processor, at least one ASIC and/or at least one FPGA may be seen as examples of circuitry. Certain logical operations may be accomplished with circuitry such as electric components such as comparators without using, for example, processors.

Processor 310 may be means for performing method steps in device 300, such as determining, providing and limiting. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 may comprise more than one transmitter. Receiver 340 may comprise more than one receiver. Device 300 may comprise sensor device 350. sensor device 350 may be suitably configured to measure the transmitted and reflected flexural vibration powers, as described herein above. Sensor device 350 may comprise more than one sensor.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Processor 310, memory 320, transmitter 330, receiver 340 and sensor device 350 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4A:
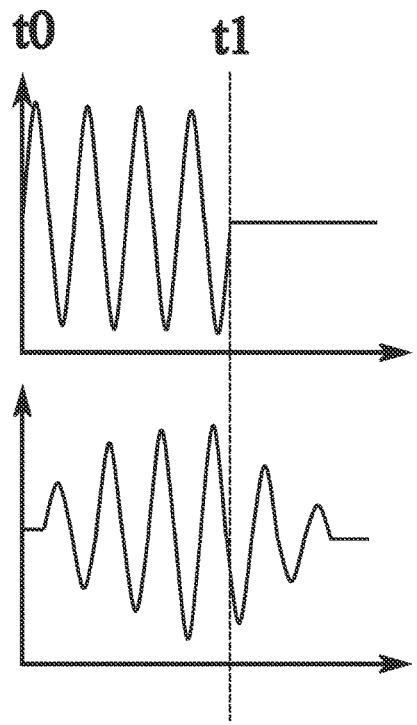
FIG. 4A illustrates a biopsy needle response to an electrical pulse.

FIG. 4A illustrates a biopsy needle response to an electrical pulse. Time advanced from the left to the right In the upper image of FIG. 4A is illustrated the timing of an electric pulse input to the transducer, to transmit flexural vibrational power to biopsy needle 120. In the lower image is illustrated a reflected flexural vibration power, received in the transducer from the biopsy needle. The input electrical pulse begins at time t0 and ends at time t1. These images reflect behaviour of an un-damped biopsy needle, that is, a situation where the needle is in air, rather than in tissue.

As may be seen from the figure, the biopsy needle responds to the electrical pulse by beginning to vibrate flexurally, such that the power of the reflected vibration increases until it reaches almost the transmitted power. In this case, close to time t1, power transmitted to the biopsy needle is received back in the biopsy needle device almost in its entirety. Once the electric pulse ends at time t1, the needle continues ringing for a while, as the flexural vibration dies out. In the illustrated case, the ringing peters out before a new pulse (not illustrated in FIG. 4A) begins. In other words, using flexural vibration it is possible to store some vibrational energy in biopsy needle 120. This is not possible to the same extent using longitudinal vibration, for example.

Figure 4B:
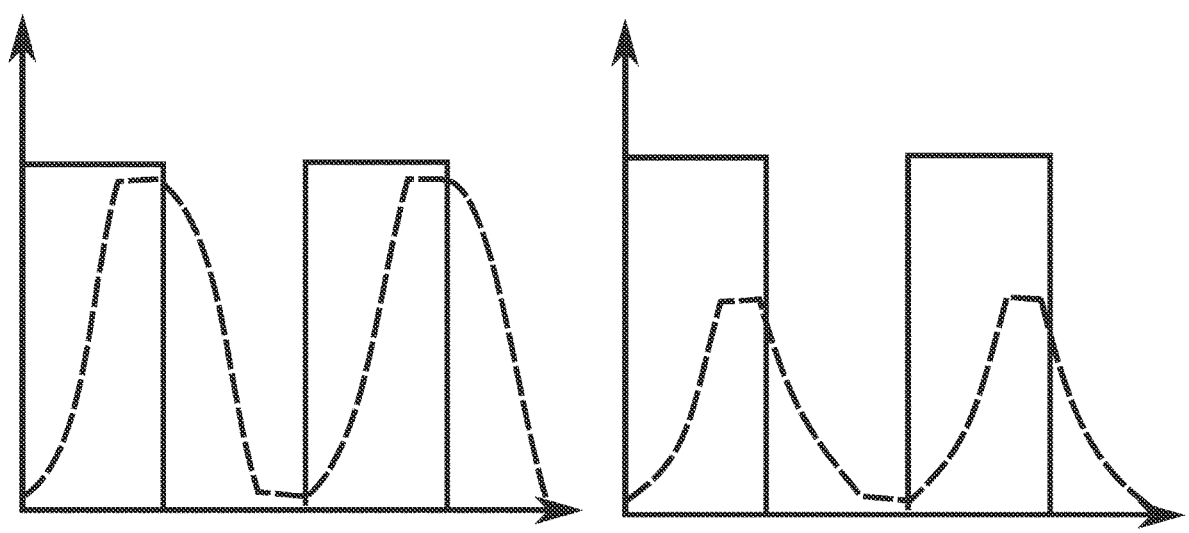
FIG. 4B illustrates biopsy needle response to electrical pulses.

FIG. 4B illustrates biopsy needle responses to electrical pulses. In the coordinate systems, power increases from the bottom toward the top and time advances from the left to the right. In the left-hand image, an un-damped biopsy needle behaviour is illustrated. A power level of an electrical pulse used to stimulate the biopsy needle is shown in solid black line, and a reflected power level is shown in dashed black line. At first, the biopsy needle is at rest as the first electrical pulse begins, the biopsy needle responds by beginning to vibrate flexurally, and the reflected flexural vibration power increases until almost the power level used to transmit the flexural vibration to the biopsy needle. Once the first electrical pulse ends, the ringing of the biopsy needle dies out before the second electrical pulse begins. The biopsy needle responds to the second pulse as it did to the first.

In the right-hand side image of FIG. 4B, a damped biopsy needle behaviour is illustrated. For example, the biopsy needle may be in tissue, causing the damping. The solid and dashed black lines correspond to transmitted and reflected flexural vibrational powers, as was the case in the image on the left. Differences to the image on the left include the lower plateau to which the reflected power rises, and a faster damping of the post-pulse ringing. The plateau is lower since a part of the flexural vibration power transmitted to the biopsy needle is deposited, rather than reflected back to the biopsy needle device.

Overall, as most of the power transmitted to the biopsy needle is available for being deposited, as opposed to being lost in losses, the risk of unintentionally applying too much power is reduced. Due to the transmission line nature of the system impedance matching from the transducer to the biopsy needle may be implemented by tapering the attachment mechanism 124 between them. An alternative method would be to use a resonating structure between them and design the coupling constants from transducer and needle to it in such a way as to obtain the desired matching. A small "bump" in reflected-wave power may occur at the time the electrical pulse is switched on or off. This bump is caused by a local resonance at the place where the attachment mechanism 124 meets the resonator. When passing this point the wave will energise this local resonance. If the resonance were to handle impedance matching it would have to be fairly large and need many cycles of the signal to fill. As a consequence, it would need a narrow resonance. Coupling to the needle in order to comply with different loading cases would be difficult: A full loading of the needle would need a close coupling to the resonator which could mean it, depending on rf frequency, could vibrate strongly in air, even to the point of breaking. The situation might be improved by allowing a mismatch. However, this would require more power to overcome the increase in losses which introduces new risks.

The biopsy needle responses illustrated in FIGS. 4A and/or 4B may be accomplished using the devices of FIG. 1B and/or FIG. 1C, for example.

Cancer diagnosis must be accurate and it is needed with as little delay as possible to enable early treatment. The diagnosis of cancer is based on the obtaining a tissue sample (biopsy) and its subsequent analysis by one or more pathologists. A streamlined diagnosis of cancer requires a high-quality tissue sample. The process is costly and requires multiple steps of tissue processing which are not fully automated, before a pathologist can examine the tissue sample to classify it as benign or malign. Whether the classification can be made or not depends on the quality of the tissue sample taken by biopsy. Ultrasound imaging, computed tomography and MRI are techniques used for needle guidance during biopsy. Ultrasound is particularly beneficial for the process, and it is the most frequently used method for needle guidance. Despite utilizing advanced methods for aiding the biopsy tissue sampling process, still there is a considerable inadequacy rate of biopsies due to incorrect sampling. The fail rate in thyroid biopsy, for example, may be up to 34%. The fail rate generally varies depending on the organ, from which the tissue sample is taken.

To enhance the success rate of tissue sampling, a reflected power measurement may be used as an aid to categorize healthy, tumour, necrotic, fibrotic or other tissue types at the tip of the biopsy needle. A brief ultrasound burst, comprising for example between 6-10 cycles of flexural waves (FIG. 4B), is transmitted to the biopsy needle. The vibrational signal is reflected back from the tip of the needle. Provided the instrument has a display showing the amplitude and phase of the back-reflected vibrational signal as function of time, as shown in FIG. 4B, for example, it can assist in identifying the tissue type where the tip of the needle is disposed. If the needle tip enters a region which is harder or softer than the surrounding tissue the amplitude and/or phase of the back-reflected signal will change. Hard tissue, such as fibrotic tissue, reflect more of the vibrational signal back than softer tissue (e.g. healthy tissue). Signal measurement may be based on reflected vibrational signal amplitude or phase shift or any combination of the two. The signal may be conveyed to the user in one or more of mechanisms, such as a LED-display, an audible signal, or a digital signal. In order to discern the influence of tissues at the tip of the biopsy needle from effects acting along it, one should use trains of sufficiently short pulses to allow for empty spaces between them. Matching the mechanical impedance of biopsy needle to the transducer, using a waveguide as explained above, has the effect of attenuating the previous pulse before the next one appears, avoiding the effects of inter-pulse interactions. This kind of tissue characterization that distinguishes between tissue at the biopsy needle tip from tissue along the needle thus requires pulsing: Using a continuous wave one would not be able to get this type of localization. An integrated device described in this application enables same biopsy device to perform both tissue characterization and tissue sampling at single puncture.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in operating a biopsy needle device.

| REFERENCE SIGNS LIST | |
|---|---|
| 110 | biopsy needle device |
| 120 | biopsy needle |
| 122 | top of biopsy needle device |
| 124 | biopsy needle attachment mechanism |
| 130 | actuator mechanism |
| 210 | longitudinal axis |
| 300-350 | structure of the device of FIG. 3 |

The invention claimed is:

1. A biopsy needle device comprising:
a biopsy needle attachment mechanism arranged to mechanically couple a biopsy needle to the biopsy needle device;
an actuator mechanism comprising a transducer configured to interconnect electrical signals at one port to flexural vibration at another port, the actuator mechanism configured to transmit the flexural vibration to the biopsy needle when the biopsy needle is coupled to the biopsy needle device;
a sensor device configured to measure a power of the flexural vibration transmitted to the biopsy needle via the transducer and a reflected power of flexural vibration received by the biopsy needle device from the biopsy needle; and
circuitry configured to determine a difference between the power of the flexural vibration transmitted to the biopsy needle and the reflected power of flexural vibration received by the biopsy needle device from the biopsy needle.

2. The biopsy needle device according to claim 1, wherein the biopsy needle attachment mechanism comprises a tapered form which matches a mechanical impedance of the transducer to a flexural impedance of the biopsy needle, when the biopsy needle is coupled to the biopsy needle device.

3. The biopsy needle device according to claim 1, further comprising an electronic device which has an electric impedance which matches an electric impedance of the transducer.

4. The biopsy needle device according to claim 1, wherein the sensor device is configured to measure an electrical power of the power transmitted to the biopsy needle.

5. The biopsy needle device according to claim 1, wherein the biopsy needle attachment mechanism comprises at least one groove configured to mechanically accept the biopsy needle.

6. The biopsy needle device according to claim 1, wherein the transducer comprises a Langevin piezoelectric stack.

7. The biopsy needle device according to claim 1, wherein the circuitry is configured to reduce a power of the actuator mechanism responsive to a determination that the difference between the transmitted and received powers of flexural vibration exceeds a preconfigured limit.

8. The biopsy needle device according to claim 1, wherein the actuator mechanism is limited to transmit the flexural vibration to the biopsy needle at most at a preconfigured maximum power, or the circuitry is configured to cause the actuator mechanism to transmit the flexural vibration to the biopsy needle at most at the preconfigured maximum power.

9. The biopsy needle device according to claim 8, wherein the circuitry is configured to maximize a ratio of the reflected power of the flexural vibration received by the biopsy needle device from the biopsy needle to the power of the flexural vibration transmitted to the biopsy needle.

10. The biopsy needle device according to claim 9, wherein the circuitry is configured to maximize the ratio by increasing the power of the flexural vibration transmitted to the biopsy needle to the preconfigured maximum power.

11. The biopsy needle device according to claim 8, wherein the preconfigured maximum power is at most 2.0 Watts.

12. The biopsy needle device according to claim 1, wherein the biopsy needle device is configured to provide to the actuator mechanism an electric signal, the electric signal comprising pulses of alternating current, the alternating current alternating at an ultrasound frequency during the pulses.

13. The biopsy needle device according to claim 12, wherein the pulses of the electric signal have equal length.

14. The biopsy needle device according to claim 12, wherein consecutive ones from among the pulses are separated from each other by a space of time equal to at least 50% of a length of a previous pulse.

15. The biopsy needle device according to claim 12, wherein each one of the pulses has a length of between 0.5 milliseconds and 1.5 milliseconds.

16. The biopsy needle device according to claim 12, wherein the biopsy needle device is configured to provide a synchronization signal which is synchronized with the pulses.

17. The biopsy needle device according to claim 1, wherein the biopsy needle device comprises a top part which has two sections, the biopsy needle attachment mechanism being in a first section of the two sections and an attachment to the actuator mechanism which comprises the transducer in a section one of the two sections, there being a curved part between the two sections of the top part.

18. The biopsy needle device according to claim 1, configured to emit a sequence of cycles of flexural waves to the biopsy needle and to provide to a user an indication of either a proportion of emitted flexural power that is reflected, or an indication that the proportion of emitted flexural power that is reflected has changed.

19. A system comprising the biopsy needle device according to claim 12 and an ultrasound imaging device, the system being configured to synchronize image acquisition by the ultrasound imaging device with the pulses.

20. A set comprising the biopsy needle device according to claim 1, and the biopsy needle.

* * * * *